United States Patent [19]

Buggert

[11] Patent Number: 4,750,113
[45] Date of Patent: Jun. 7, 1988

[54] DUAL FUNCTION I/O CONTROLLER

[75] Inventor: Jerrold E. Buggert, San Juan Capistrano, Calif.

[73] Assignee: Unisys Corporation, Detroit, Mich.

[21] Appl. No.: 707,112

[22] Filed: Feb. 28, 1985

[51] Int. Cl.$^4$ ............................................. G06F 13/00
[52] U.S. Cl. ................................................. 364/200
[58] Field of Search .............................. 364/200, 900

[56] References Cited

U.S. PATENT DOCUMENTS

| 4,162,520 | 7/1979 | Cook et al. | 364/200 |
|---|---|---|---|
| 4,268,906 | 5/1981 | Bourke | 364/200 |
| 4,313,162 | 1/1982 | Baun et al. | 364/200 |
| 4,371,932 | 2/1983 | Dinwiddie | 364/200 |
| 4,371,948 | 2/1983 | Chadra | 364/900 |
| 4,390,964 | 6/1983 | Horky et al. | 364/900 |
| 4,430,710 | 2/1984 | Catiller | 364/200 |
| 4,443,850 | 4/1984 | Harris | 364/200 |
| 4,490,788 | 12/1984 | Rasmussen | 364/200 |
| 4,499,538 | 2/1985 | Finger et al. | 364/200 |
| 4,602,327 | 7/1986 | LaViolette et al. | 364/200 |

Primary Examiner—Archie E. Williams, Jr.
Assistant Examiner—Emily Y. Chan
Attorney, Agent, or Firm—Alfred W. Kozak; Nathan Cass; L. Joseph Marhoefer

[57] ABSTRACT

An I/O controller functions to provide management of, control of, while functioning as two "virtual" data link processors for at least two separate types of peripheral terminal units, thus enabling data transfers between a host computer and any selected one of the peripheral terminal units. A commonly shared logic interface, common to both virtual controllers, is selected for use by a Request-Program Array Logic unit which arbitrates the utilization of the common logic by one of two virtual controllers at any given time. A first and second status latch is provided in the common front end interface of the I/O controller whereby each status latch provides status signals to the main host computer system of the state of any one of two virtual controllers which share common interface to a host computer. At the particular time that the host is addressing one of the virtual controllers (for the purpose of initializing communications with that controller) via its status latch register, a path is provided to the I/O microprocessor in the controller such that microprocessor access to that status latch is temporarily inhibited in order to maintain stable status signals for the interrogating host computer.

6 Claims, 10 Drawing Sheets

FIG. 2. PRINTER/TAPE DLP (DATA FLOW).

FIG. 4A. PRINTER-TAPE: DATA LINK PROCESSOR.

FIG.5.
PRINTER INTERFACE STATE MACHINE-FLOW CHART.

μ PROCESSOR  (INTERFACE) I/F

CHECK FOR DREQ
INITIALIZE DMA FOR SEND
PROVIDE 1st DATA BYTE
START TRANSFER ⟶ SET PREQ

WAIT FOR DST — NO
↓ YES

PST PUTS OUT DATA
PDREQ 1 USEC LATER
PDACK LATCHES DATA
CHECK FOR PEOD — NO
↓ YES
(INTERRUPT)
PST PUTS OUT DATA

CHECK FOR DREQ ⟵ RESET PREQ
INITIALIZE DMA FOR RECEIVE
START TRANSFER ⟶

CHECK FOR DREQ — NO
↓ YES
PROVIDE PST

DST LATCHES DATA & PPARERR
PROVIDE PDREQ
ENABLE LATCH ON PDACK
CHECK FOR PEOD — NO
↓ YES
CHECK MESSAGE ⟵

DREQ = DATA REQUEST
PREQ = PRINTER REQUEST
DST = DATA STROBE
PST = PRINTER STROBE
PDREQ = PRINTER-DATA REQ.

PEOD = PRINTER-END OF DATA
PDACK = PRINTER-DATA ACKn.

PPARERR = PRINTER-PARITY ERROR

FIG.6.
TAPE INTERFACE STATE MACHINE-FLOW CHART.

μPROCESSOR        INTERFACE (I/F)

WRITE

CHECK STATUS
INITIALIAZE DMA FOR WRITE
LOAD FIRST WORD TO I/F
START TRANSFER ───────► PROVIDE 1st BYTE
                          │
                          ▼
                        WAIT FOR WSTR ──NO─┐
                          │ YES            │
                          ▼                │
                         TEOD              │
                    ┌─────┴─────┐          │
                    ▼           ▼          │
                 PROVIDE     PROVIDE       │
                 2nd BYTE    2nd BYTE      │
CHECK STATUS ◄── W/LASTWRD                 │
                             WAIT FOR WSTR─┤
                                │ YES   NO │
                                ▼          │
                             PROVIDE TREQ  │
                             TACK LATCHES DATA

READ

CHECK STATUS
INITIALIZE DMA
START TRANSFER ───────► WAIT FOR RSTR
                        RSTR LATCHES 1st BYTE
                        IDBY & RSTR?
                    ┌────NO──────────YES────┐
                    ▼                       ▼
( SEE FIG.6A. FOR LOG. )   SET ODDXFR    RSTR LATCHES
                           SET TEOB      2nd BYTE
                                         PROVIDE TREQ
                                         TACK ENABLES
                                         DATA ONTO UPDAT
                                         IDBY & RSTR? ──YES─►
                                            │ NO
                                            ▼
CHECK STATUS ◄──────────────────────── SET TEOB

FIG. 6A.

```
    WSTR = WRITE STROBE
    TEOD = TAPE-END OF DATA
 WLASTWD = WRITE-LAST WORD
    TEOB = TAPE-END OF BLOCK
    TREQ = TAPE REQUEST
    RSTR = READ STROBE
   UPDAT = MICRO PROCESSOR DATA
    IDBY = DATA-BUSY
  ODD X FR = ODD BYTE-TRANSFER
```

FIG. 7A.

```
    CLK = CLOCK
    ALE = ADDRESS LATCH ENABLE
   M/IO = MEMORY or I/O SELECT
   ADØ15 = ADDRESS LINES 0-15
     RD̄ = READ
   DT/R̄ = DATA { TRANSMIT
                 { RECEIVE
```

NOTE:
DUAL PORT RAM WILL HAVE NECESSARY ACCESS INFORMATION BY END OF CLOCK ONE (1), ALLOWING INTERLEAVED ACCESS IN EITHER CLOCK TWO (2) OR CLOCK THREE (3).

① 20 NS SETUP   ② 10 NS HOLD

③ 60 NS DELAY   ④ 10 NS DELAY

FIG. 7. MICRO-PROCESSOR / DLI BUFFER TIMING.
READ: (MICRO-PROCESSOR SYSTEM.) (SEE FIG. 7A.)
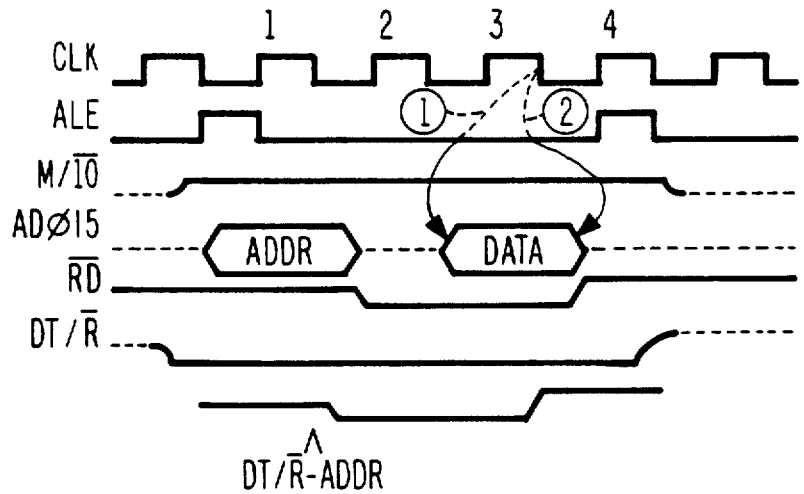
WRITE: (MICRO-PROCESSOR SYSTEM USING MICRO-PROC. DMA CONTROLLER.)
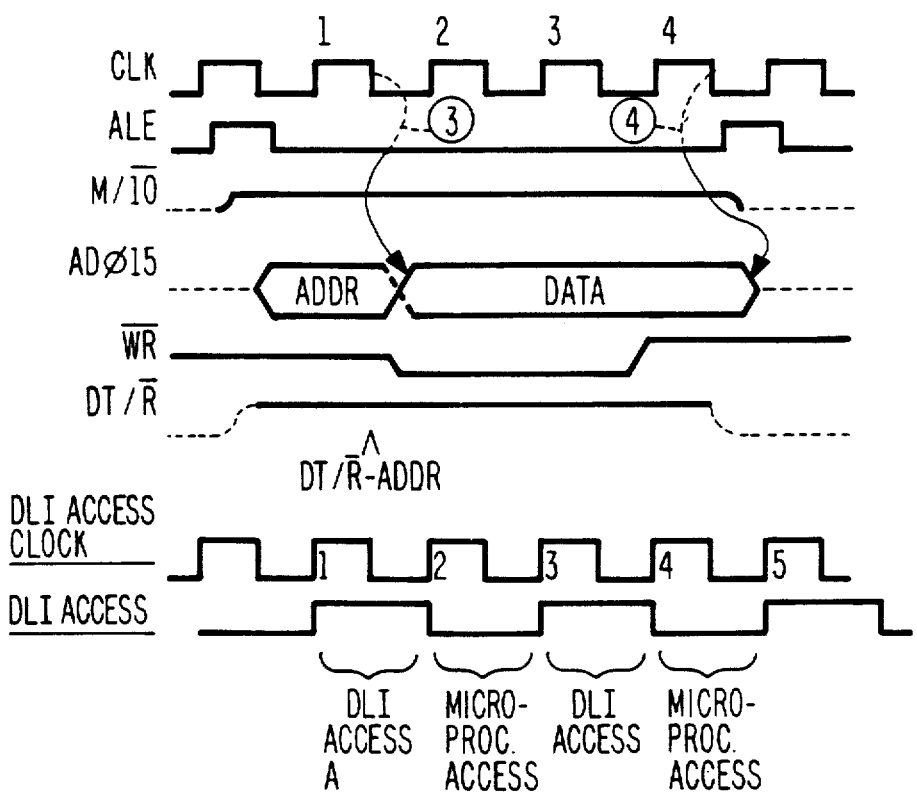

DUAL FUNCTION I/O CONTROLLER

FIELD OF THE INVENTION

This disclosure relates to peripheral controllers which are used to transfer data and control signals from a main host processor system to remote peripherals and to provide the functions of an input-output controller for data transfer operations.

BACKGROUND OF THE INVENTION

It is one of the basic functions of a computer system to communicate with remote peripheral devices in order that data transfers and control signals may be interchanged in order to accomplish the purposes designed into the computer system or network.

In order to facilitate this data interchange, there have been developed peripheral controllers, also called I/O controllers or Data Link Processors (DLP's), which relieve the main host computer of many of its operating cycles for the purposes of seeing to it that data exchanges between various remote peripheral devices and the main host computer system can be accomplished with minimal interruption to the main host computer system.

A series of specialized I/O controllers have been developed by the Burroughs Corporation for handling the specialized requirements of Burroughs computer systems and peripherals. These specialized peripheral controllers have been designated as "data link processors", or DLP's.

These specialized Burroughs data link processors have been specifically designed to handle the applicable protocols and the various data transfer requirements usable by Burroughs computer and Burroughs peripheral devices. Such types of data link processors have been described in such prior patents as:

U.S. Pat. No. 4,313,162 entitled "I/O Subsystem Using Data Link Processors"; U.S. Pat. No. 4,371,948 entitled "Train-Printer-Data Link Processor"; U.S. Pat. No. 4,390,964 entitled "Input/Output Subsystem Using Card Reader Peripheral Controller".

These background patents are included herein by reference to furnish the background and functional operation of data link processors which are used to link a host computer and peripheral terminals.

These patents describe the unique features and operations of the Burroughs type of data link processors and provide specific details of operation of the data link processors in conjunction with Burroughs computer systems and networks. These prior patent applications describe the various types of possible operations and data transfer control signals which are used in data link processors. Accordingly, these patent applications will provide an in depth background and explanation of the various hardware and intercooperating features which are used in data link processors.

As a matter of background, the Burroughs type of data link processors (I/O controllers, also formerly called line control processors) are designated as "status driven". This means that each condition of operation of a DLP (data link processor) is assigned a "status number" which indicates the condition of the DLP and what it is capable of doing in that condition. Thus, the host computer and also the DLP itself must keep cognizant of the "status number" of the DLP.

The "status" driven nature is shown in U.S. Pat. No. 4,390,964 at column 12 and Table O-SS. This patent is entitled "Input/Output Subsystem Using Card Reader Peripheral Controller" and is included by reference.

Another description of usage of the status count is described in U.S. Pat. No. 4,162,520 in connection with FIGS. 7A, 7B, 7C, 7D, 7E-1, 7E-2. This patent is entitled "Intelligent Input/Output Interface Control Unit for Input-Output Subsystem" and is also included by reference.

The information as to the status count condition of each one of several DLPs in a system is important data for the host computer and other control elements in the system, especially where interface logic is shared by two or more DLPs.

The present invention is a data link processor which is compatible with Burroughs computer networks and systems but which has been specifically developed to handle two types of remote peripheral devices by means of one single data link processor. This data link processor is called the buffered printer-tape data link processor (PT-DLP) and is disclosed herein.

SUMMARY OF THE INVENTION

The present disclosure presents a combination of intercooperating hardware elements which interface the main host computer system on the one hand and provide for data transfers and communication to and from two different types of remote peripheral units. These peripheral units constitute a buffered-printer terminal unit and also a streamer tape peripheral unit which may be daisy chained to provide communication transfers between the host and four tape units.

Thus, the present system architecture permits the sharing of one host system interface between two peripheral interfaces by means of one particular unit designated as the printer-tape data link processor.

In the described data link processor, there are provided first and second "virtual" controllers, one for the printer peripheral and one for the series of tape peripherals. Both the virtual controllers must share a DLI front end interface to the host system (DLI=data link interface).

Since the shared common front end interface logic can only be utilized by only one virtual controller at one given time, there is provided an arbitration system for selecting which virtual controller gets to utilize the shared interface logic.

Since these virtual controllers operate as "data link processors" which follow a prescribed set of routines identified by "status counts", the system provides two status registers to keep the host informed of the operating status capability of each controller. A request-programmable array logic unit (REQ-PAL) receives data to determine which virtual controller will utilize the shared interface logic at a given time.

Thus, if the host addresses the first virtual controller and also the first virtual controller requests service, the REQ-PAL will enable the shared logic to transmit an ID of the requesting controller to the host system. On the other hand, if the host addresses the first virtual controller, and the first controller is not requesting service but is "ready", then the shared interface logic is made available to convey a command from the host to the first virtual controller. The REQ-PAL is controlled by a microprocessor system acting as master to control slave subsystem which helps to execute data transfers.

A direct memory access (DMA) switch unit is provided with two control data channels to the tape control unit which are used to manage data transfers between the master microprocessor and the tape peripheral units. When "control data" is being transferred from along one channel to a tape control unit and subsequently the actual "data" transfer cycle is concluded, then the tape control unit is automatically switched to connect to the other "control data" channel without the need for intervention by the master microprocessor system. This is done to maintain more rapid data flow in both directions without having to burden the master microprocessor.

Thus, the architecture of the presently disclosed printer-tape data link processor provides for a very efficient and time saving method by which one particular I/O controller can regulate the data transfer flows between two types of peripheral terminal units (in particular a printer unit and up to four tape units) all the while permitting simultaneous data transfer operations from a buffer memory in both directions to and from the main host computer and to and from the peripheral units.

BRIEF DESCRIPTION OF THE DRAWINGS

FIG. 5 is a functional flow diagram which shows the basic operation of the printer interface state machine;

FIGS. 6 and 6A are a functional flow diagram which shows the basic operation of the tape interface state machine;

FIGS. 7 and 7A are a timing diagram of the Read cycle, Write cycle and DLI Access cycle of the microprocessor system and shows the DLI state machine controller access period interleaved with the microprocessor system access period for inserting or withdrawing data from the buffer memory of the data link processor.

DESCRIPTION OF THE PREFERRED EMBODIMENT

As with other types of Burroughs data link processors, such as those described under the headline "Background of the Invention", the present data link processor is compatible with most computer systems which use the message level interface (MLI) for parallel transfer of data control signals and data between the main host system and the data link processor as was described in the earlier patent cases on data link processors. Thus, in FIG. 1, the distribution card 20 interfaces the host via the MLI, and interfaces the data link processor via the DLI.

Figure 1:
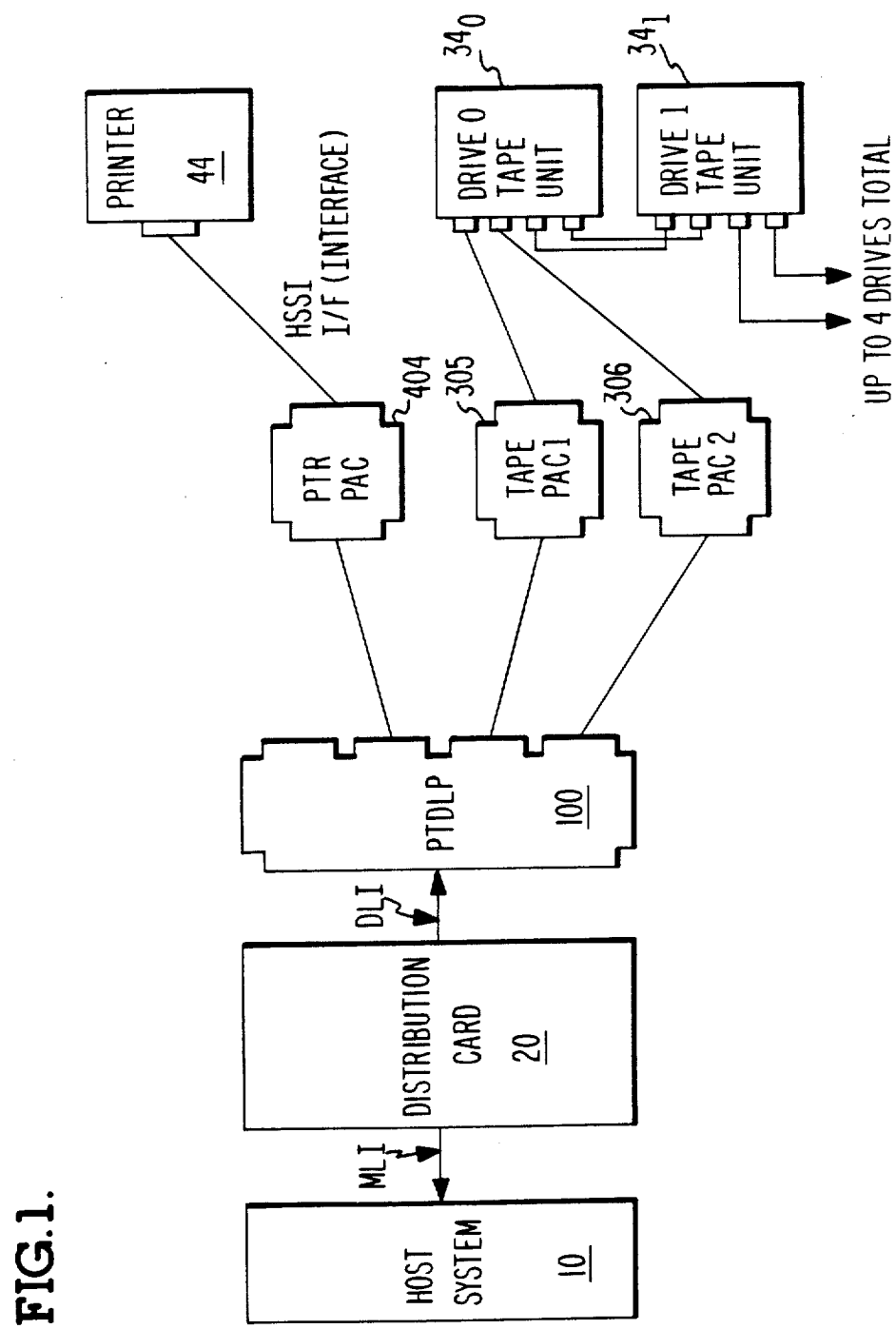
FIG. 1 is a block diagram showing how the printer-tape data link processor operates with a main host system in order to provide an interface to remote peripheral units.

The printer-tape data link processor (PTDLP), 100, FIG. 1, when seen from the viewpoint of the host computer system, will be seen by that system as a separate printer DLP and a separate streamer-tape DLP. Each of these two functional data link processors (which are here combined in one unit) have an address line (LCP address) and also a request line (LCP request) line just as if they were two separate data link processors. Thus, the functions and description of the present printer-tape data link processor will be presented descriptively in two sections which will be descriptive of the buffered printer section and another section which is descriptive of the streamer tape section.

All the hardware of the printer-tape data link processor is mounted on one logic board which interfaces to a data link interface backplane. There are front plane cables which connect to the peripheral adapter cards (PAC's) which are shown in FIGS. 1 and 4 as elements 305, 306 and 404 (connected to printer '44). Thus, as seen, there is one PAC 404 used in the printer interface 40, and FIG. 2, and there are two PACs (305, 306) connected to tape drives $34_o$ and $34_i$, which are used in the streamer tape interface units 30, FIGS. 2 and 3.

Figure 2:
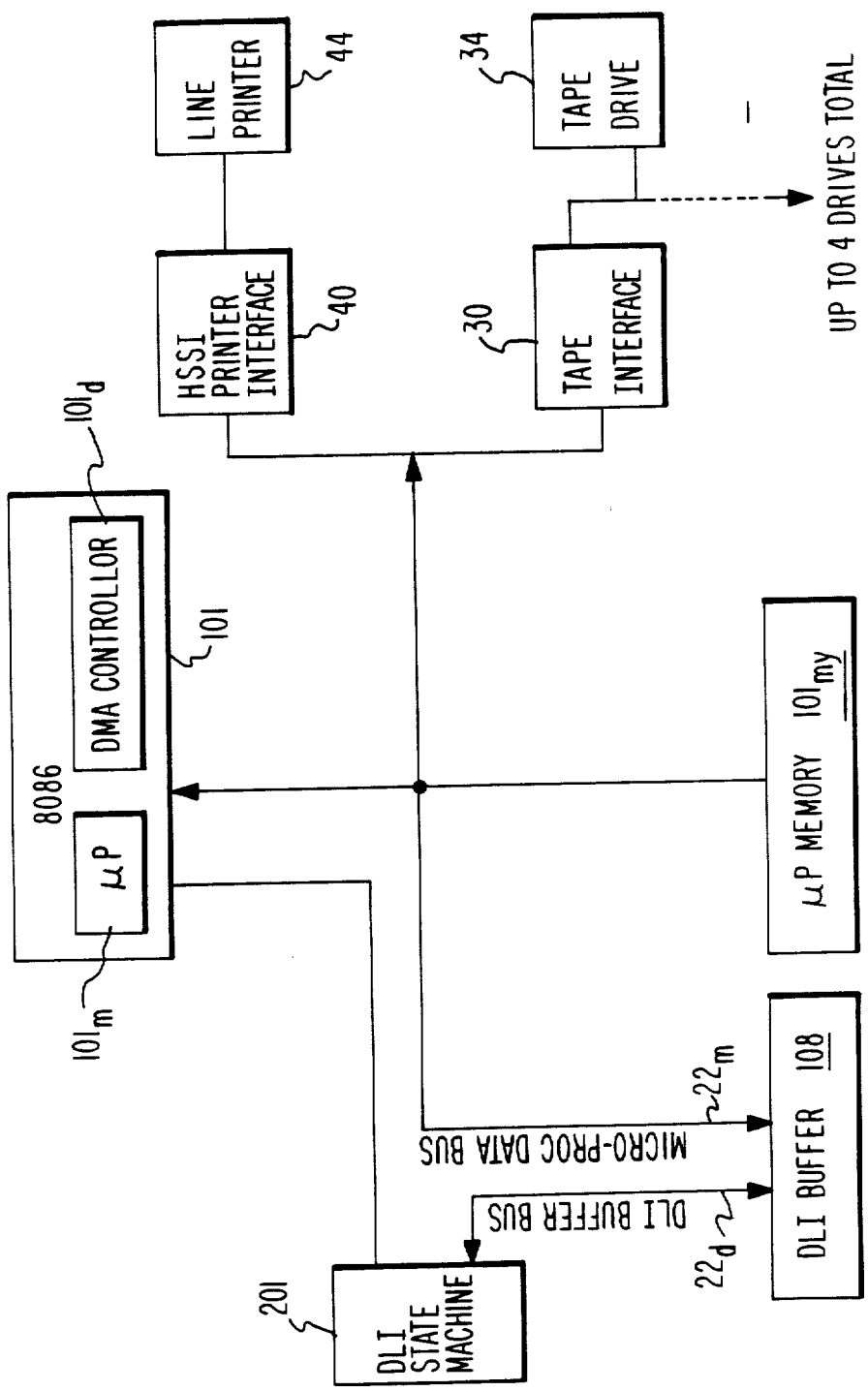
FIG. 2 is a block diagram showing the main elements of the printer-tape data link processor with special reference to the data flow lines.

The streamer tape interface unit will be seen on FIG. 2 as element 30 and it will allow direct connection to four magnetic tape streamer units such as developed by the Burroughs Corporation for magnetic tape peripheral units. This interface 30 does not require (and also does not permit) a tape control unit (TCU) in the path to the tape drive. The formatter and the control for the tape drive are contained within the tape drive.

As seen in FIG. 1 the tape drives can be daisy chained one to another such that up to four magnetic tape streamer units can be daisy chained using a single controller card and the two peripheral adapter cards 305 and 306 of FIG. 1. An interface cable is extended through a connector on each tape drive and the last tape drive in the chain uses a terminator connector.

The tape drive can operate at 25 or up to 100 inches per second under software control, with a rewind speed of 200 inches per second. Thus, this gives a data transfer rate of 40 or 160 kilobytes per second on the peripheral interface. Approximately 40 megabytes of data will fit on a 2400 foot 10½ inch tape reel when using 5,000 bytes for each record.

The tape format used is the ANSI standard X 3.39-1973 (PE) which is 1,600 bytes per inch, phase encoded (PE) with the standard inter-record gaps. This allows the same tapes to be written-on and read, on both the magnetic streamer unit tape drives and also the 75/125 inch per second phase encoded tape drive units.

The printer-tape data link processor is organized to provide a unique and selectable data link processor address for the tape interface.

The other interface is the printer interface 40 of the data link processor. The printer interface connects to a Burroughs high speed standard interface (HSSI) which is seen as element 40 in FIG. 2. This interface can be modified by the Burroughs printer interface protocol used in Burroughs systems. Only one printer unit, line printer 44, may be connected to the printer-tape data link processor through the single peripheral adapter card 404 of FIG. 1.

The data rate allowable to the printer interface is 31.25 kilobytes per second. The data rate from the printer interface can be 153.8 kilobytes per second on the Burroughs B 924 printers. On the Burroughs B 9246 printers, the data rate from the printer interface is 100 kilobytes per second.

As was previously mentioned in regard to the "tape" interface, the data link processor (DLP) also provides a uniquely selectable DLP address for the "printer" interface.

With reference to FIGS. 1, 2, 3 and 4, the following description will indicate the various functions of the hardware shown in these drawings and with special reference to FIG. 4.

The printer-tape data link processor consists of a microprocessor system 101 which controls three other state machines. The microprocessor system 101 also includes a DMA controller $101_d$ and microprocessor $101_m$. The controllers discussed herein are sometimes referred to as "state machines".

The three other state machine controllers involved are:
 (a) The DLI interface 201 (FIG. 4);
 (b) The printer interface state machine 401 (FIG. 4);
 (c) The tape interface state machine 301 (FIG. 4).

A dual-port DLI buffer memory 108 (FIGS. 2, 4) of 8K bytes and the microprocessor local RAM memory ($101_{my}$, FIG. 2) of 4K bytes are used to buffer the data to and from the peripheral units.

Microprocessor System

Figure 3:
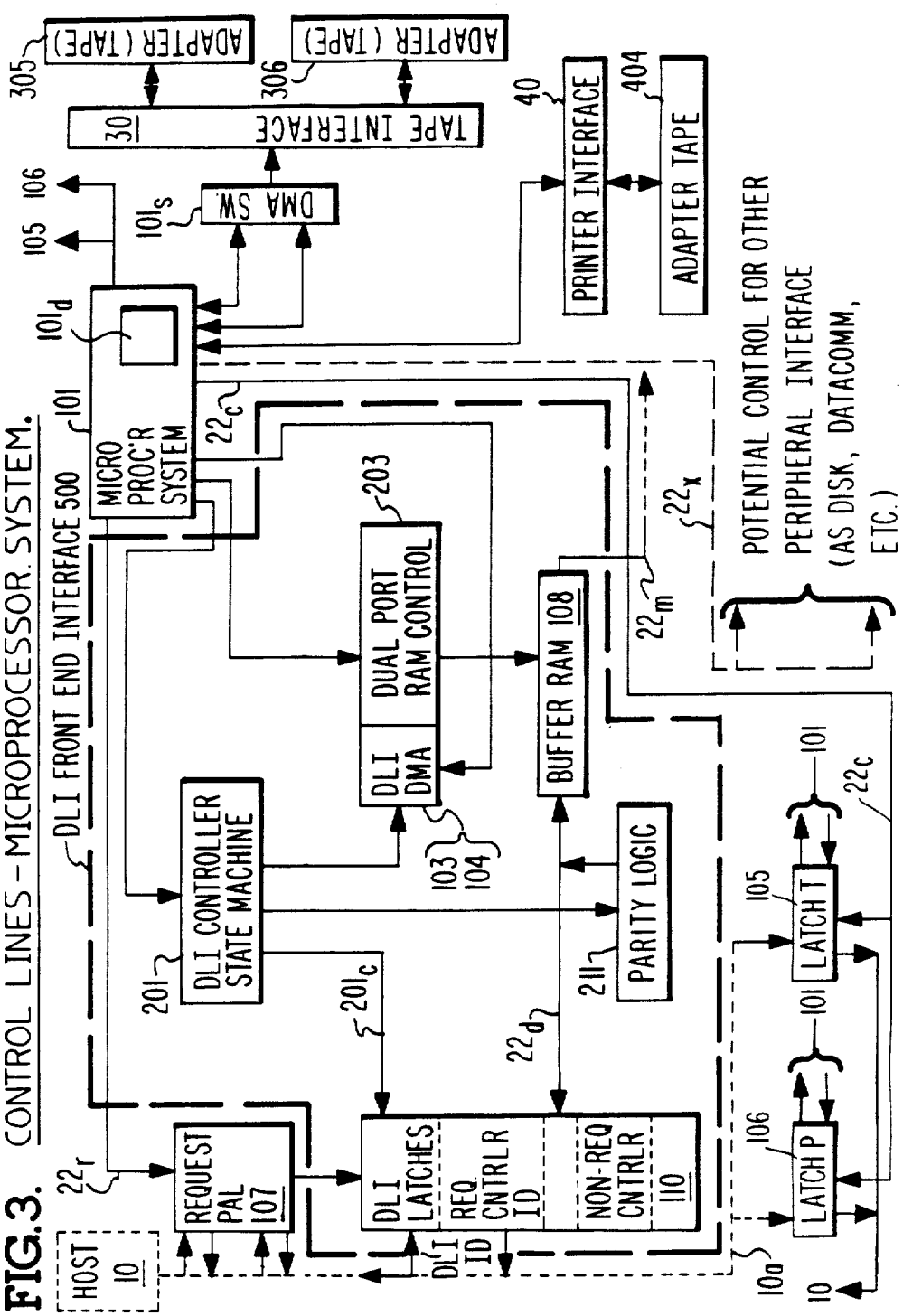
FIG. 3 shows a more detailed block diagram of the printer-tape data link processor indicating how the control lines of the microprocessor system links the data link interface front end to the peripheral terminal units.
Figure 4:
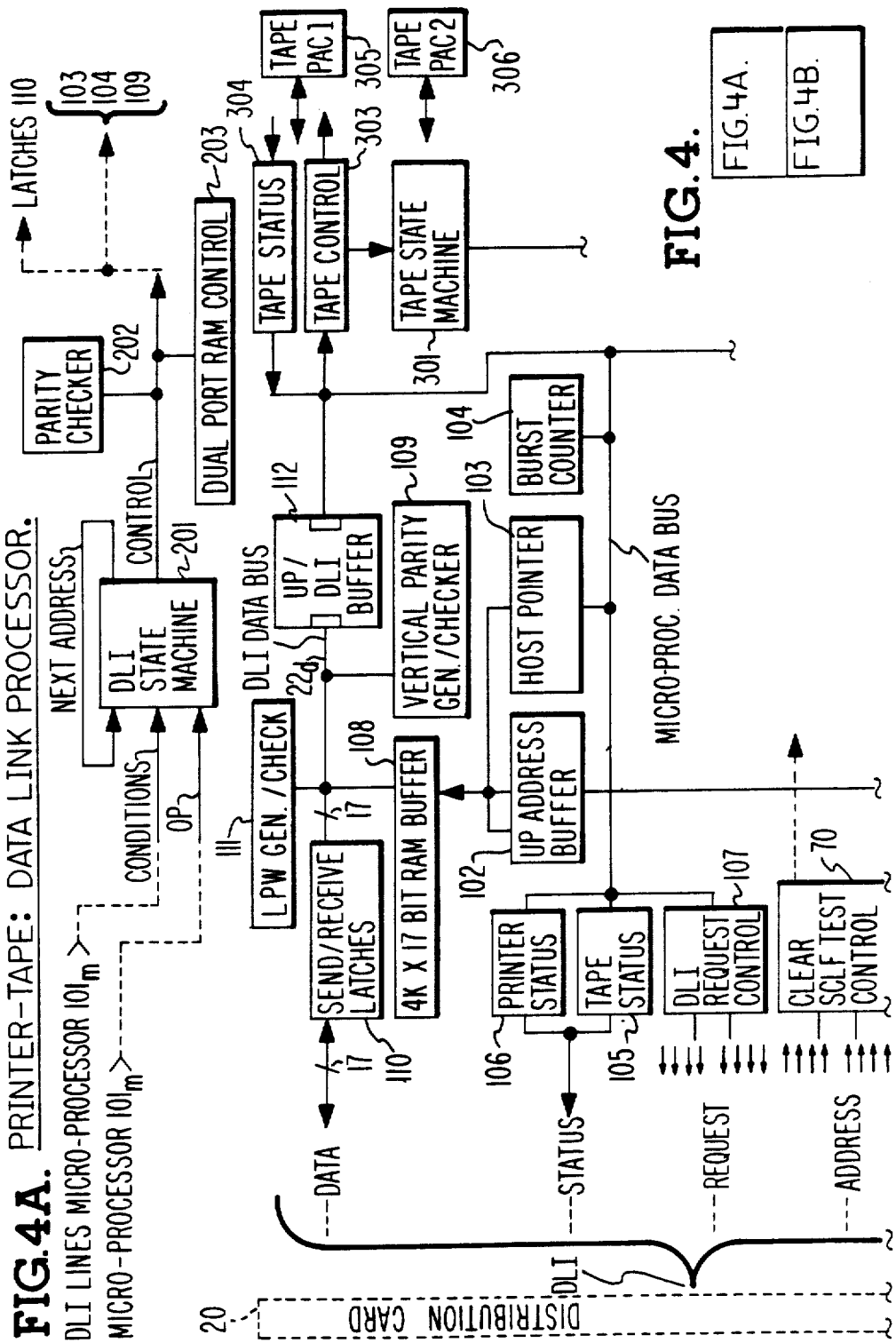
FIGS. 4A and 4B are an overall block diagram of the printer-tape data link processor.

The microprocessor system 101 shown in FIGS. 3 and 4 includes an interrupt controller (in 101), a DMA controller $101_d$ of FIG. 3, device selection logic (113, FIG. 4), a RAM (108 of FIGS. 3, 4) and an erasable PROM (EPROM) and a RAM which operates within block 101 of FIG. 4. All program storage is situated in the EPROM.

The microprocessor $101_m$ is an 8 megahertz 16-bit microprocessor of the type designated by Intel Corp. as the 8086. This processor unit is described in the handbook entitled "iAPX 86, 88 Users Manual", pages 1-2 through 2-72, copyright 1981, published by Intel Corp. of 3065 Bowers Avenue, Santa Clara, Ca. 95051.

The microprocessor system 101 provides for 6K bytes of addressing space in which there is provided a memory map which covers the following functions:
 (a) 32 kilobytes of EPROM for interrupts and functional codes;
 (b) 8 kilobytes for the dual-port RAM (108);
 (c) 4 kilobytes for the memory-mapped I/O;
 (d) 4 kilobytes for local RAM memory ($101_{my}$);
 (e) 16 kilobytes of EPROM for reset and MTR (Maintenance Test Routines) code.

This local EPROM memory is split into two banks which are separately enabled by a signal called the "Bus High Enable" and by the A0 address line.

Address decoding is done in two stages. The first stage is done by a programmed logic array designated FPLA. Devices which require a longer setup time for selection will use outputs from the first stage directly. These include the memory (in 101), the interrupt controller (in 101) and the DMA controller ($101_d$).

The control latches (110, FIGS. 3 and 4) and the status buffers such as 105 and 106 of FIG. 4 (which are accessed by the microprocessor 101) will use the outputs from the second stage which consists of three decoders (113, FIG. 4) which are enabled by the first stage.

The interrupt controller (in 101) is used in the edge-triggered mode in order to detect the DLI message designated DLIMESS (DLI Message) and also the signal DMAEND (direct-memory-access-end-of-transmission), in addition to the 500 microsecond timing signal. The interrupt controller (in 101) provides vector addresses for the microprocessor $101_m$. The cable $22_x$ shown in dotted lines of FIG. 3 represents a line of control signals which can be used to control other peripherals or for data communication.

The clear/self test interrupt (70, FIG. 4) is tied to the non-maskable interrupt line of the microprocessor 101 (Intel 8086). The board self test/reset and the manual self test/reset are tied to the reset line of the microprocessor 8086. The non-maskable interrupt and the reset interrupts will generate vectors internally within the 8086 and remove the interrupt controller (in 101) from the self test operations loop.

The DMA controller ($101_d$) is used to transfer data to and from the peripheral interfaces 30 and 40 (FIG. 3) and also the microprocessor local memory $101_{my}$ (FIG. 2). The DMA controller will also transfer data to and from the tape interface 30 and the dual port buffer memory 108 of FIGS. 3, 4.

One of the DMA channels will be dedicated to the printer interface. Then, two of the channels will be dedicated to the tape interface. The DMA controller $101_d$, in the microprocessor system 101, has two "control data" channels to a DMA switch $101_s$ in FIG. 3 which are used to alternately switch "control data" to the tape interface 30.

A multiplexor (in $101_s$, FIG. 3) is implemented in a programmed array logic unit which directs the request, the acknowledge, and the end-of-process signals to the appropriate channels. An "end of process" signal from the DMA controller ($101_d$), while servicing the tape interface, will cause a switch to the alternate tape "control" channel after the current acknowledge occurs.

A signal (OVRUN) produced from the DMASWITCH signal (of $101_s$) in the programmed array logic will be used to indicate that the switch over has occurred before the microprocessor has had time to initialize the channel. Thus, the signal "UP.DSRST" is used to "reset" the internal OVRUN state when initializing the DMA channel, when this occurs.

A microprocessor/DLI buffer unit 112 buffers data on the data bus $22_d$ (FIG. 4), which is transmitted to tape control unit 303. The output of the controller 201 is parity checked by parity checker circuit 202.

In FIG. 4, the local address latches 60 provide local printer addresses or local tape addresses to the Clear-Self Test Initialization Control 70.

Microprocessor System Clocks

The clock for the microprocessor 101 is derived from the 8 megahertz DLI backplane clock (50, of FIG. 4) using a delay line and gating. The "ready" input to the microprocessor 101 (8086) is synchronized to a clock by a D flip-flop. The clock for the DMA controller $101_d$ uses the 8 megahertz backplane clock divided by two in order to yield a 4 megahertz clock for the DMA controller $101_d$, FIG. 4.

DLI Interface

The DLI interface (DLI Front End, FIG. 3) consists of the clear and the self test initiation logic 70, FIG. 4; the DLI send/receive registers (110); the burst counter 104, FIG. 4; the burst-end logic (103); the longitudinal parity word generator 111, FIG. 4; the vertical parity generator and routing (109); the request and emergency request logic (107) and the DLI/controller communication logic (in 201).

A 2K×24 bit DLI state machine (201, FIG. 4), with parity, accepts condition signals from the microprocessor 101 and controls the data elements. The DLI state machine 201 (FIGS. 3, 4) also accepts status signals from and also provides control of portions of these elements. The specific types of control are as follows:

Functions of DLI State Machine Controller (201, FIG. 3)

(a) The clear and self test initialization logic (70 of FIG. 4) can detect when various types of clears and self tests are required. The signal LOCPAL detects the local address for either the printer or the tape data link processor and validates it with the signal ADRVLD (address valid) and the signal LOCAD (local address).

The comparison of the local address switch to the "LOCAD" signals is synchronized by system 101 for the PS (printer select) and the TS (tape select) signals;

(b) Generation of the clear and the self test signals, the resets, and the interrupts is performed by the signal "ADSTCL" (address, self test, clear PAL) or the programmed array logic. It also generates the signal "CONNECT" using the DLPADP (printer DLP address) and the signal DLPADT which is the tape DLP address signal;

(c) The DLI send/receive registers are implemented by bidirectional register latches (110 of FIG. 4). The output enable signal onto the DLI is generated by the "CONNECT" signal and by the IOSEND signal. The latch enable from the DLI is controlled by the AF (asynchronous flag) signal. The clocking and enabling from the DLI front end is controlled by the DLI state machine 201, FIG. 4.

(d) The burst counter 104, FIG. 4, is implemented on a 20×8 PAL which is programmed as an 8 bit counter. It can be read and loaded by the master microprocessor $101_m$, with the count enable generated by the DLI state machine 201;

(e) The burst end logic in 101 uses the signal TERM (terminate), the signal CO (carry out of the burst counter), and the signal STIOL (strobe I/O level) in order to provide a condition input to the DLI state machine 201, FIG. 4, to halt the burst mode;

(f) The longitudinal parity generator 111 of FIG. 4 is implemented in two program-array-logic units which are programmed to perform the longitudinal parity word accumulation. A data pipelining latch composed of two latches 111 is used to meet the timing requirements on the internal DLI data bus ($200_d$, FIG. 4) The microprocessor $101_m$ controls the clearing and examines the longitudinal parity word "zero" status (LPWZERO) which indicates whether or not the transmitted word is without error. the DLI state machine 201 controls the accumulation and reading of the LPW generator 111. The pipelining latch-enable (connecting 201 to unit 111) is also controlled by the DLI state machine 201;

(g) Vertical parity generation and routing is performed by two 9-bit parity generators (109, FIG. 4) in conjunction with quad 2×1 tri-state multiplexors. A bidirectional register/latch 111, FIG. 4, is used to send and receive the parity bit on the data link interface. Vertical parity is generated and written into the parity RAM (part of 108) when writing into the dual port RAM (108 of FIGS. 3, 4) from the microprocessor system 101.

Vertical parity is checked when writing into the dual port RAM (108) from the DLI interface (FIG. 3) and the actual DLI parity is written into the parity RAM (of 108). Vertical parity is read from the parity RAM when reading onto the DLI data link interface. The timing of the memory-write cycle is met by using a tri-state buffer instead of using the tri-state capability of a bidirectional register latch. A flip-flop is used to store the parity checking result and is used to produce the signal VPERR (vertical parity error) status signal to the microprocessor $101_m$;

(h) Request and Emergency Request logic is implemented in a programmed array logic unit designated REQPAL (in 107). The microprocessor $101_m$ controls the setting of the printer request, the tape request and the emergency tape request signals. The signal REQPAL monitors the emergency request input to remove the printer request. It will also reset the tape request if the tape emergency request is not set. The DLI state machine controller 201 controls the clearing of the REQPAL requests when they are granted to meet the DLI timing requirements;

(i) The DLI/microprocessor communication logic, within 201, is contained in a programmed array logic unit called the DLI/UP PAL. Two settable and clearable flags are provided. The flags are:

(i) UPMESS—microprocessor message to the DLI;
(ii) DLIMESS—DLI state machine message to the microprocessor 101.

The DLI state machine parity error flip-flop is also implemented in the DLI/UP PAL. The microprocessor $101_m$ issues DLI operations (DOPS) to the DLI state machine 201 and sets a flag (UPMESS), which is fed into the state machine condition logic. The DLI state machine then carries out the operation. The DLI state machine controller 201, then, can carry out the following operations:

Send strobe
Read data (one word)
Write data (one word)
Read burst
Write burst
Wait for connect to host
Wait for disconnect from host
Wait for AF signal (AF signal means handshake signal with host—so the controller 201 can wait for AF in order to tell the microprocessor $101_m$ when the host is ready)
Send LPW (Longitudinal Parity Word)
Read host pointer
Move LPW to the RAM
Load the Send Register
Move Receive Register to the RAM
Load LPW from the RAM
No operation Upon completing the given operation, the DLI state machine controller 201 will set the signal DLIMESS, which will provide an "interrupt" to the microprocessor $101_m$. After the initial DLIMESS interrupt signal, the line DLIMESS will act as a "status input" to the microprocessor $101_m$ instead of the interrupt occurring constantly while connected to the host system 10.

A parity logic circuit 211 connects the controller 201 to the data bus $22_d$. A bus $201_c$ carries address data from controller 201 to the DLI latches of FIG. 3.

The DLI state machine controller 201 is implemented using three 2K×8 registers in the PROM for the control store and pipelined register. The condition logic in 201 is implemented in a program logic array, FPLA, and the condition latch is provided in two latch units.

The inputs to the condition logic of DLI state machine 201 (FIG. 4) are also available to the microprocessor $101_m$ as status inputs. A 3-bit microcode field is provided for condition selection. Another 3-bit field is provided for the unique next address selection of the DLI state machine 201 within any operation.

Four bits of the control store address in 201 are provided by the DOP (DLI operations). This gives the addressing environment for an operation. Three bits of the address are provided by the unique next address field. Four bits of the address are provided by the condition code inputs.

Parity checking of the control store (in 201) is done during the DLP operation by three 9-bit parity generators. The parity error indication is held in the programmable array logic designated DLI/UP PAL (201, FIG. 4).

The dual function I/O controller described herein provides a system whereby one controller services a host computer so that the host computer can communicate with two separate virtual controllers (located on one printed circuit board and which share certain common logic circuitry) to effectuate data transfers.

To maximize efficiency and to avoid the wastage of host interface components, the host computer must be informed of the status of the addressed virtual controller before trying to execute data transfer operations. Problems can arise in that the status of both virtual controllers must be available for interrogation by the host computer.

Since the host computer may be physically connected to only one controller at a given time, then a conventional controller's host interface logic is "idle" while the host is connected to other controllers on the data link interface (DLI).

This problem of possible interrogation of status of either virtual controller by host is solved by the provision of first and second status latch registers which carry information on the status of the first and second virtual controllers. Thus, the host will always have valid status information presented to it by the virtual controller which the host is currently addressing.

The relationship of a host computer trying to communicate to/from two peripherals through one I/O controller having two virtual controllers functioning within it also presents other problems. These are;

A. When either or both of the virtual controllers make a request for service from the host computer, then it is necessary to arbitrate and resolve the use of the commonly shared front end interface logic (110 of FIG. 3).

B. The control of the interface logic hardware (DLI latches 110) must be done based on the controller currently requesting service and the controller currently addressed by the host computer.

C. During the time that the host is interrogating the status of each controller, there must be a "temporary maintenance" of the status signal in the respective status latches so that the status signal will provide one certain reading and not flip between two different conditions while being read.

The presently described dual function I/O controller system is made to handle and resolve these aforementioned problems.

The arbitration of which virtual controller shall receive the attention of the host computer is resolved by a "Request Programmable Array Logic Unit" which bases its resolution on data showing which virtual controller is the "requesting" controller and which controller is the "non-requesting" controller, plus additional data which indicates which virtual controller is being currently addressed by the host computer.

From this input information the "Request PAL" will select which controller will get to use the commonly shared front end interface logic (DLI latches 110, FIG. 3).

In order to maintain "stability" of data input to the host computer while the host computer is interrogating certain status latches (status latch 106 for the printer-virtual controller, and status latch 105 for the tape unit-virtual controller), the microprocessor system will inhibit the microprocessor (101, FIG. 3) from "writing into" one of the latches 105 or 106 when the host is addressing that latch.

Referring to FIG. 3, the dual function I/O controller will be seen to incorporate "two" data link processors (DLPs) which share the DLI front end interface, all operating within "one" controller. The controller accomplishes this by the use of two protocol status latches, designated as 106 and 105, FIG. 4, which are addressed from the host system 10 in order to return to the host the current DLI interface state of the addressed data link processor. As seen in FIG. 3, the I/O controller constitutes a data link processor in the one case for a plurality of tape units working through tape interface 30, and in the other case constitutes a data link processor for the printer peripheral unit through the printer interface 40.

Due to the nature of the data link interface (DLI), the host 10 can only address "one" data link processor in the DLI interface at any one point in time. This DLI interface characteristic allows the interface logic in the DLI front end interface (500, FIG. 3) to be commonly shared.

The writing of the printer status latch 106 and the tape status latch 105, FIG. 4, can be conditionally done by the microprocessor 101, such that the latches 106 and 105 may or may not be written into, while the host is addressing that respective DLP.

This conditional writing of the status latches 106 or 105 satisfies a requirement on the DLI interface that certain state transitions can only occur while the host is "not addressing" the data link processor for which the status signal is presently being written.

The system will operate such that when the host computer addresses a virtual controller via the shared DLI interface, then the microprocessor 101 is inhibited from changing the status signal in the status latch register involved.

A status signal is returned to the microprocessor 101 (returned by the latch to the microprocessor) to indicate the result of the "conditional write".

An "unconditional write" to the printer and tape status latches is also provided to fulfill other requirements of the DLI interface.

As also will be seen in FIG. 3 the microprocessor system 101 potentially could be connected to a data comm interface and also a disk interface. Thus likewise, the dual functionality of the I/O controller may be used to alternately control the transfer of data to and from the data comm interface or the storage module device (disk) interface on an alternate basis through the dual functionality of the I/O controller.

Support of more than two types of peripheral interfaces would entail adding an additional status latch for each additional virtual controller (with associated control circuitry) to permit sharing of the DLI interface logic.

Referring to FIG. 3, there is seen in the block "DLI Front End Interface" 500 the "shared logic" which is common to the two virtual controllers (printer-controller and tape-controller).

The host 10 will provide an address (for the printer or tape controller) via the Request PAL 107 after the microprocessor 101 has sent a request on line 22r to the Request PAL 107.

Thus, the shared logic (DLI latch 110) will have data identifying the "Requesting Controller" and the "Non-Requesting Controller". When the "requesting controller" is the controller which the host is addressing, ID (identification) information will be sent to the host (10) from DLI latches (110). When the "non-requesting controller" is the controller which the host is addressing, the DLI latches (110) are made available to receive command information from the host 10.

The host 10 will address (via 10$_a$, FIG. 3), the requesting controller's status latch, for example, printer latch 106, to get status information.

From the data of which the host is addressing and the data of which the virtual controller is requesting, the Request PAL 107 will arbitrate the situation and control the direction of data transfer to or from the host.

In FIG. 3 the line 22$_c$ is used by microprocessor 101 to write status signals into the status latches 105 and 106.

The microprocessor 101 will send either a Printer-Request (or Tape Request) to the Request-PAL 107 over line 22r to indicate the "Requesting Controller".

The Request PAL 107 receives addresses from the host computer and maintains the data of which controller is requesting in order to determine whether the host will receive ID information from the requesting controller or send commands to the non-requesting controller via the shared DLI latches 110.

The latches 105 and 106 (FIGS. 3 and 4) have output lines to microprocessor 101 to indicate whether they have or have not accepted a status signal from the microprocessor, since if the host 10 addresses a status latch, then that particular latch may not accept a new status signal from the microprocessor at that time.

Line 22r from the microprocessor 101 to REQ-PAL 107 is used to indicate which virtual controller is requesting service from host.

In substance, the major activity in arbitrating which virtual controller (printer or tape) will be utilized can be summarized as follows:

1. The host 10 addresses one of the status latch registers (105 or 106, FIGS. 3, 4).

2. The microprocessor 101 then receives information (from the addressed status latch 105 or 106) as to which controller (printer or tape) has been addressed.

3. Microprocessor 101 also receives data from the addressed status latch (105 or 106) as to the "state" of the chosen controller. This state signal to microprocessor 101 permits a decision to be made by the microprocessor system 101 as to what direction data transfer will occur, what type of data will be transferred, and what the new status will be placed in 105, 106 by the microprocessor 101. The microprocessor 101 controls the REQ-PAL 107 via line 22r of FIG. 3.

4. The host 10 then provides a command to the chosen controller to transfer data.

5. This command is executed by the microprocessor 101.

6. The REQ-PAL 107 generates a request for service to be done by the host 10.

7. The microprocessor 101 then places ID identification data into the shared logic DLI latches 110 to thus identify the "requesting" controller.

8. The microprocessor 101 then commands the REQ-PAL 107 to enable the appropriate direction of data transfer as between the host 10 and the chosen controller.

9. The microprocessor 101 then sends a signal to change the state of the previously addressed status latch (105 or 106).

10. The microprocessor 101 then causes the REQ-PAL 107 to make a request to host 10 for service for the chosen DLP.

11. The host 10 then addresses the chosen controller (DLP for printer or tape).

12. The system then returns to step (2) above wherein microprocessor 101 receives data from the status latch (105 or 106). The routine then continues on to steps 3, 4, 5, etc.

It may be noted that the host may arbitrarily interleave the addressing of either virtual controller within the constraints of the DLI protocol.

Printer Interface

The printer interface consists of data send and data receive latches (403 of FIG. 4), parity generation and checking circuitry (not shown), a printer state machine controller 401 for interface control, and peripheral buffers (in 404) and loop back buffers (in 404). Additionally, a printer timing unit 402 provides printer timing signals to printer controller 401.

The printer send/receive latches 403 are implemented by latching and enabling signals which are controlled by the printer interface state machine controller 401 (FIG. 4). Requests for data are made by the microprocessor system 101 (microprocessor 101$_m$ or the DMA controller 101$_d$ therein), together with the PUDAPSEL (printer-microprocessor data selection line).

The printer parity generation and checking is done by a 9-bit parity generator. Selection of the source of the inputs and the destination of the outputs is done by the printer state machine controller 401. The printer parity error is held in the printer program array logic in 401 (PRTPAL) and is used as a status indication to the microprocessor 101$_m$.

The printer interface state machine controller 401 is implemented by the array logic of the PRTPAL. It performs functional transitions which are shown as a flow chart in FIG. 5.

Tape Interface

The tape interface (30 of FIG. 2) consists of send/receive latches, read and write parity generation, command registers, status buffers, and a tape state machine controller 301 (FIG. 4) to control the interface, peripheral buffers, and loop back buffers.

Figure 4B:
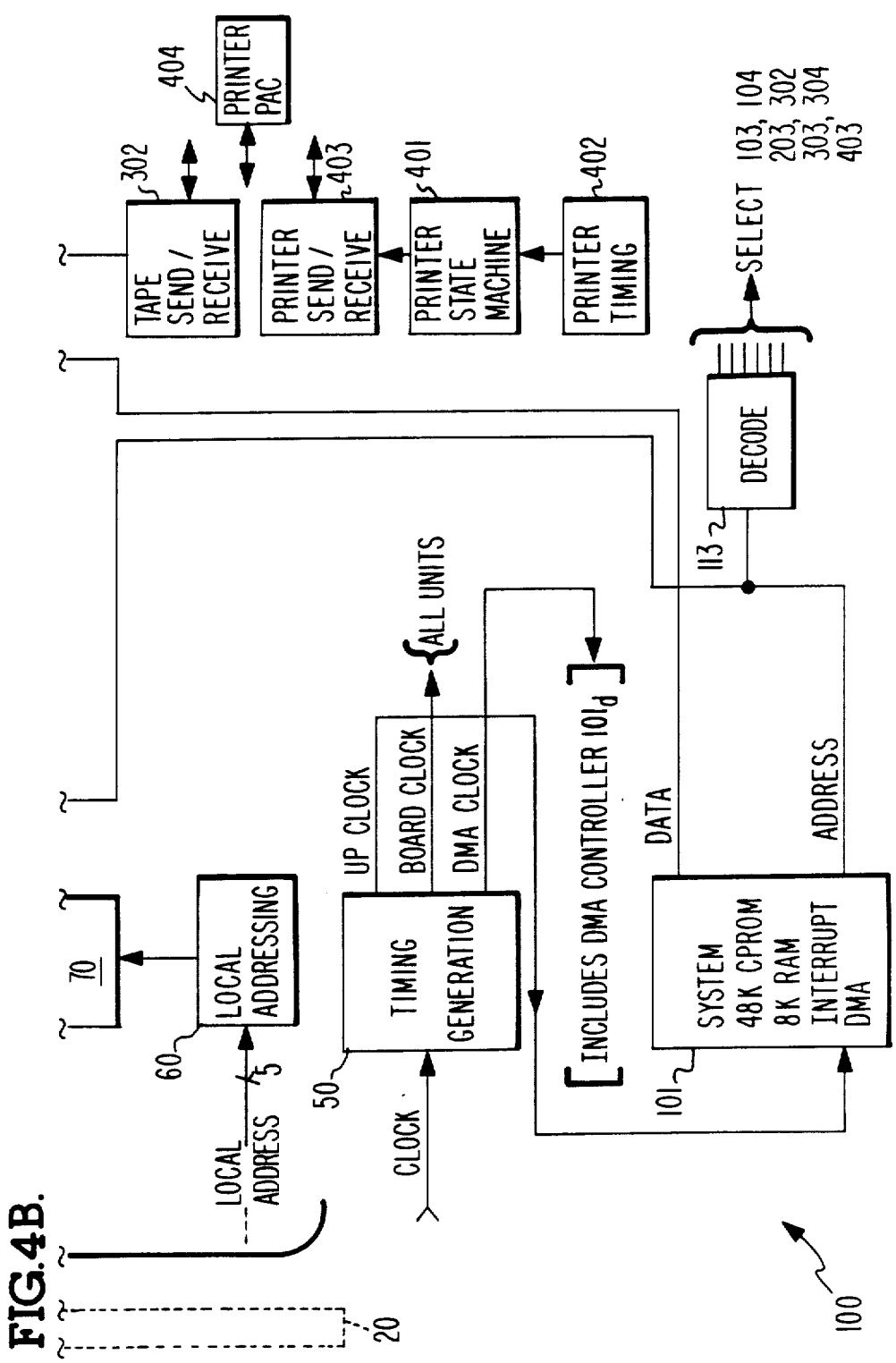

The send/receive latches 302, FIG. 4B, are implemented by four bidirectional latch/registers which provide one 16-bit word of data latch. The tape state machine controller 301, FIG. 4A, controls the loading and the enabling of the two 8-bit halves of the data latch to multiplex or demultiplex the data.

The read and write parity generation for tape transfers is performed by two 9-bit parity generators. Parity is generated on the "write" data path and checked on the "read" data path. When writing data to the tape, the read-after-write head returns the data which was written and the drive validates it with a strobe signal IRSTR (inverted read strobe).

The parity error indication is caught and held in the tape programmed array logic 304 (TAPPAL). The drive also produces a hard error signal (IHER) and also a corrected error signal (ICER) to indicate that the drive has detected parity errors from the tape. These signals are also caught and held by the tape programmed array logic, TAPPAL.

Command registers are implemented with two registers in the tape interface 30. Command signals, address signals and strobe signals are written in parallel onto these registers.

Status buffers return information on the currently addressed tape drive unit to the microprocessor $101_m$. The following signals: IHER (hard error); ICER (corrected error); the IFMA (file mark detected); the IEOT (end of tape); and the TPARERR (tape parity error) are pulses from the tape drive which are caught and held for access by the microprocessor $101_m$ by means of the TAPPAL. The TAPPAL 304 provides an error strobe signal as a tape data trap. It detects an error and holds the error signal until the end of the data transfer cycle at which time it informs $101_m$. The other status signals are provided directly from the addressed tape drive.

The tape interface state machine controller 301 is implemented in the programmed array logic 304 (TAPPAL) which is programmed to catch pulses and to sequence through several states. It controls the multiplexing and the demultiplexing of the two 8-bit halves of the data latches and the request/acknowledge handshake signal with the DMA controller, $101_d$, FIG. 3.

The tape interface state machine controller 301 will be seen to perform the functions which are flow charted in FIG. 6.

The tape peripheral buffers are on the two peripheral adapter cards 305 and 306 shown in FIG. 3 and in the interfaces 30 and 40 of FIG. 2. There are loop back buffers on the peripheral adapter cards to allow testing of the data and the control paths to the peripheral adapter cards, PAC 305, 306.

The signal M.TAPDAT is used to control the loop back paths in 305 and 306. The signal M.TAPDAT refers to "maintenance tape data" where the maintenance program is used to test the control paths and data paths between the logic cards of the DLP 100 and the peripheral adapter cards (PAC) 305, 306, and 404. When the maintenance program is enabled, the buffers to and from the peripherals are disabled and the path (in 302) between the read and the write paths is enabled. This allows the testing of the control and data paths between the main logic cards of the printer-tape DLP and the PAC's 305, 306, 404.

Dual Port Memory

The DLI buffer memory 108 (of FIGS. 2, 4) is a two port memory allowing access from the DLI state machine 201, and the master microprocessor system 101 which includes the microprocessor $101_m$ and the DMA controller, $101_d$.

The address path for the DLI state machine 201 is from a counter implemented in two program array logic units. This counter is initialized by the microprocessor $101_m$. The address path for the microprocessor system is through two buffers (address buffer 102, FIG. 4).

The "DLI data path" and the "microprocessor system data path" are separated by data latches. These data paths are shown in FIG. 2 as $22_d$ and $22_m$.

The control of the dual port memory (108 of FIGS. 2, 3, 4) is done by the dual port program array logic (shown as element 203 in FIGS. 3 and 4). It is programmed to do a "look ahead" of the request requirements of the DLI state machine controller 201 and the microprocessor system 101. It provides the data and address path "enabling", the RAM chip select, the RAM write enable and the microprocessor system "ready" signal. It also uses the signal AF (asynchronous flag) and the BURST signals to do a clock by clock (FIG. 7) interleaving of the DLI 201 and the microprocessor $101_m$ memory requests during the burst mode.

Self-Test Operations

The printer-tape data link processor (PT-DLP) has been designed to support the "self-test" function with three methods of initiation and two methods of reporting functionality of the data link processor.

The data link processor will begin its self-test function upon receipt of any of three clear signals:

(a) foreplane clear which is generated by a pushbutton switch that is local to the main logic card;

(b) a power-up clear;

(c) two types of self-test initiation signals from the test bus on the DLI backplane. These two types consist of either being addressed and cleared while in the local mode, or by being generally addressed by the PT-DLP local general address and the complete self-test initiation signal being "true". The SWITCH lines are used to select between testing either (i) the printer portion; (ii) the tape portion; or (iii) a complete test of the printer-tape data link processor. The foreplane clear and the power-up clear both initiate a complete self-test of the printer-tape data link processor.

After initiation of the self-test of the data link processor portion being tested, this will disable its peripheral and DLI interfaces until such time as the data link processor passes its own self-test. A status of "zero" together with the signal LCPCON/O will be presented to the backplane whenever the addressed data link processor is executing or has failed to execute its self-test, or, in the case of a detectable on-line failure, such as a PROM parity error or a microcode sequencing error.

On the foreplane, four red light-emitting diodes (LED's) will also indicate the status of the test. When any of these LED's are "on", the data link processor is either in the process of self-testing, or has failed the self-test, or has detected an on-line failure.

The "top" LED displays the status of the self-test in relationship to the main logic card; the next one shows the status of the self-test with respect to the printer interface and its peripheral adapter card (PAC 404); the next LED light shows the status of the self-test with respect to the tape interface and the tape peripheral adapter card board #1 (305); and the fourth light shows the status of the self-test with respect to the tape interface and peripheral adapter card board #2 (306).

If a LED light is left on after the specified time for execution of the self-test, it indicates which card failed first. If the top LED light is "on" past the specified time for the test, it indicates that the peripheral adapter card (PAC) was not tested but that the main logic card has failed its self-test.

The scope of the self-test is a test of the main logic board hardware which affects the addressed device and the confirmation of the data paths to and from the peripheral adapter cards.

Drivers and receivers of the peripheral units (34, 44, FIG. 1) and the DLI interface (FIG. 3) are untestable by the self-test function and they require a stand-alone or a peripheral test driver test.

The length of the self-test for the printer section of the data link processor can be set not to exceed a predetermined number of seconds. Likewise, the length of the self-test for the tape section of the data link processor can be set so that it shall not exceed another set value of a predetermined number of seconds. Likewise, the length of the self-test for the complete data link processor (including both printer section and tape section) shall not exceed another predetermined set number of seconds.

Referring to FIG. 3, there is seen the dual port RAM control 203 which is controlled by the microprocessor system 101; and the data link interface controller 201 in conjunction with the DLI-DMA (direct memory access unit 103, 104, also in FIG. 4).

The dual port RAM control 203 is used to control the RAM buffer 108 of FIG. 3.

It may be noted that while FIG. 3 mainly shows "control" lines, FIG. 3 also shows data buses where data can be transferred from the host 10 through the DLI latches 110 over through the DLI data bus $22_d$ and into the RAM buffer 108. Here the data may be processed via bus $22_m$ through the microprocessor system 101 and transferred either to the tape interface 30 or the printer interface 40, for later transfer to the peripheral.

Likewise, the data from either the printer peripheral unit 44 or the tape peripheral unit 34 may be transferred through the interfaces 40 and/or 30 on to the microprocessor system 101 and hence through the buffer RAM 108 and over through the DLI data bus $22_d$ to the host 10.

The buffer RAM 108 may be considered a "dual port" RAM for the purpose of storing temporarily the data which is either travelling from a peripheral unit to the host system ("Read") or for data which is travelling from the host system to a selected peripheral unit ("Write"). Thus, data flow through the RAM buffer 108 is concurrent and simultaneous in either direction. This is accomplished through an "interleaving" process cycle.

Referring to FIG. 7, there is shown a series of timing diagrams which show the clocking signals used for data transfer in the "Read" direction and for data transfers in the "Write" direction. The "Read" direction means that data is being transferred from a peripheral terminal unit to the buffer memory 108 for later transfer over to the main host system. The "Write" direction means that data is being transferred from the main host system to the buffer memory 108 for later transfer to a selected peripheral terminal unit.

In FIG. 7 it will be seen that by the end of the clock 1 time, the dual-port RAM 108 will have the necessary access information to permit an interleaving of data to occur at the clock 2 time or the clock 3 time.

In the Read cycle of FIG. 7, the first line shows the clocking signal. The second line designated ALE is the signal which indicates the microprocessor address latch enable.

The third line designated M/IO is the signal which indicates whether microprocessor $101_m$ is selecting memory space or I/O space.

The fourth line designated AD015 indicates the relationship between the valid address signal and the actual valid data signal which is separated by 1 clock. It shows the use of the bus for address information and the time period available for data transfer.

The fifth line shows the signal $\overline{RD}$. This signal indicates when the read data can be transferred into or out of the RAM 108.

The sixth line which is labeled with DT/$\overline{R}$ indicates the Data Transmit/Receive condition which indicates the direction of data flow.

In the second portion of FIG. 7 there is seen the "Write" cycle. As before, the clock signal, the ALE signal, the M/IO signal, the address signal and the DT/$\overline{R}$ signal are the same except for line 5 where we have a $\overline{WR}$ or Write signal instead of a Read signal.

In the Write cycle it will be seen that immediately after the address is provided, the data for the Write direction can be transferred out to the peripheral adapter units.

It will also be noticed that, in the Read cycle, there is a 20 nanosecond set-up time for the read-data and a 10 nanosecond hold time for the read-data.

In the Write cycle there is a 60 nanosecond delay after the address data in order for the write data to be transferred. The write data has a 10 nanosecond delay which permits clearance of data from the buffer register in the RAM 108.

The third (lowest) portion of FIG. 7 shows the DLI access clock with a sequence of clock cycles numbered 1, 2, 3, 4, 5, etc. Here, during the first clock cycle, the DLI state machine 201 has access to the buffer memory 108 (for either transferring data out or transferring data in).

The next clock cycle (cycle 2) then provides the second time period for the microprocessor $101_m$ to gain access to buffer 108 (for either transferring data in or transferring data out). Then access periods alternate between availability for the DLI controller 201 and the master microprocessor $101_m$.

Thus, it is possible to have "Read" data moving from a peripheral unit to the main host system concurrently and at the same time that "Write" data is moving from the main host system to a peripheral unit through the same RAM buffer 108 even though various registers of this RAM buffer are used.

Figure 8:
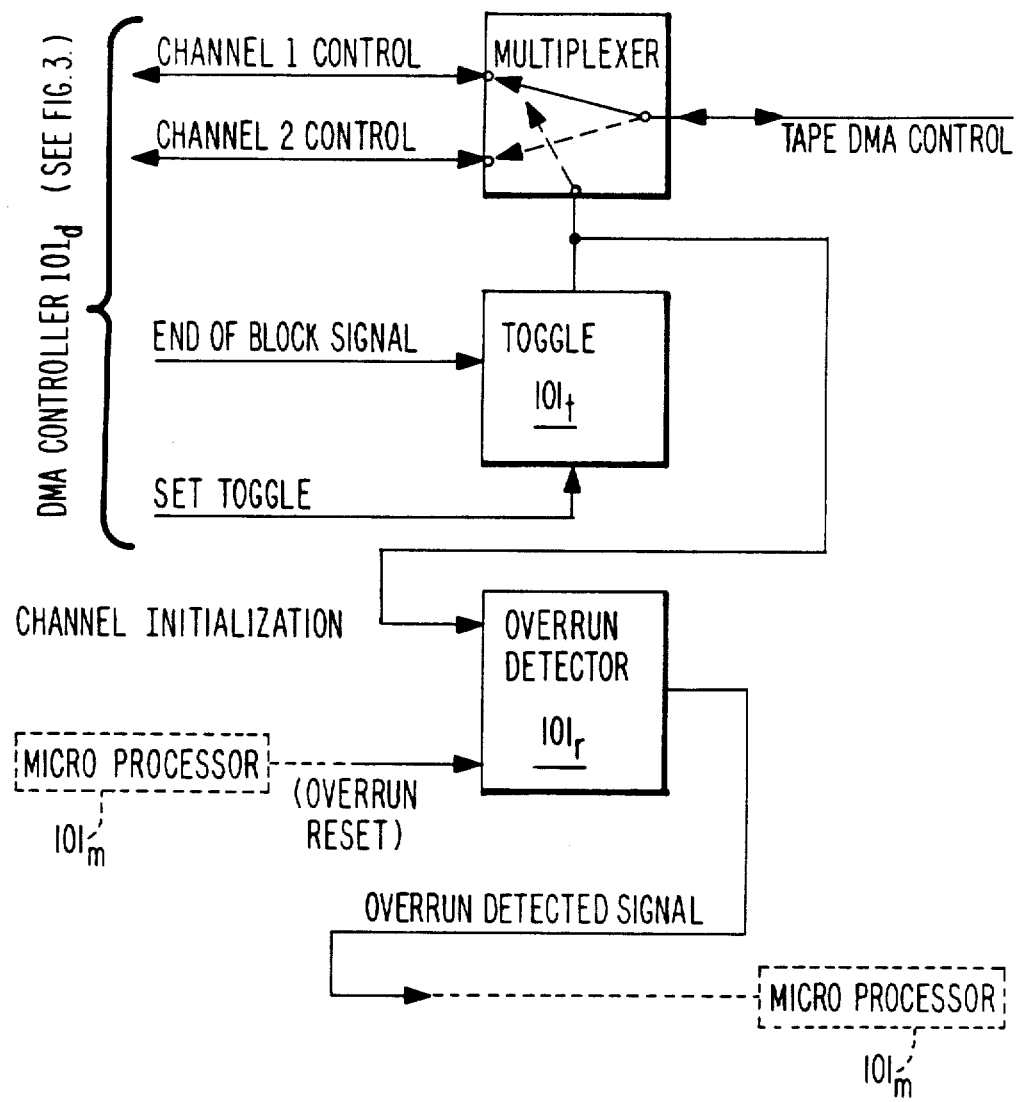
FIG. 8 is a schematic diagram illustrating the automatic channel switching for control data utilization.

With reference to FIG. 8, there is shown schematically how multiplexor $191_m$ is used to switch between channel 1 and channel 2 for control data operations. A toggle $101_t$ controls the channel switching in the multiplexor $101_m$.

At the end of the transfer of a data block, the End-of-Block signal from DMA controller $101_d$ causes toggle $101_t$ to change state. This switches the tape DMA control signals (from 101 and 30 of FIG. 3) from channel 1 to channel 2, and vice versa using multiplexor $191_m$.

The overrun detection circuitry $101_r$ will detect an "error" condition wherein the "other channel being switched to" has not yet been initialized by microprocessor $101_m$. In this event, the non-initialized condition would cause invalid data to be transferred to the peripheral tape unit.

There has thus been described a peripheral controller where a master microprocessor commands and coordinates the operation of a DLI (data link interface) slave controller, a tape interface slave controller, and a printer interface slave controller which permits a buffer memory in the DLI interface front end to intake and to output data-being-transferred concurrently in either direction (host to peripheral or peripheral to host) in an interleaving cycle process. Further the master microprocessor controls a DMA switch unit which permits alternate control data channels to manage data transfers to/from the tape peripheral units by causing a control channel switchover each time after a block of data is transferred to/from a tape unit. In particular for this embodiment, a shared common front end interface logic is utilized by two virtual controllers according to arbitration factors determined by a Request-Programmable Array Logic.

While other possible embodiments may also be used to effectuate the features described herein, the invention should be understood to encompass the system described in the following claims:

What is claimed is:

1. A dual function I/O controller for managing data communications between a host computer and two or more peripheral units, said controller comprising:
   (a) a first virtual data link processor (DLP) for managing data transfers to/from a printer peripheral unit;
   (b) a second virtural data link processor (DLP) for managing data transfers to/from a plurality of tape peripheral units;
   (c) a shared common logic interface unit for interfacing said host computer to said first and second data link processor, said shared common logic interface unit connected to receive control signals from said first and second virtual data link processors, from an arbitration means, and from a microprocessor system;
   (d) said arbitration means for selecting the usage of said shared common logic interface unit by said first or second data link processor for extecuting data transfer operations between said host computer and a selected printer or tape peripheral unit, said arbitration means connected to receive control signals from said host computer, said first and second virtual data link processors, and said microprocessor system; said arbitration means including:
      (d1) a data link interface (DLI) latch unit connected to receive data from a DLI controller state machine and said microprocessor system and from a Request-Programmable Array Logic Unit (REO-PAL), said DLI latch unit including:
         (d1a) bidirectional connections to said host computer; and,
         (d1b) means to receive signal data from a DLI controller state machine to indentify which virtual data link processor is requesting service;
      (d2) said microprocessor system functioning to send indentification data of the requesting first or second DLP to said DLI latch unit;
      (d3) a REQ-PAL (Request-Programmable Array Logic unit) for receiving address data from said host computer, which specifies a particular peripheral unit, and for receiving instructions from said microprocessor system, said REQ-PAL including:
         (d3a) means to determine whether said first or second DLP will utilize the said shared logic interface unit, said determination being accomplished via an internal algorithm which selects said utilization according to either:
            (i) concurrence of a request by one of said printer or tape peripheral units with said host computer presently addressing that printer or tape peripheral unit; or,
            (ii) the host computer addressing a particular printer or tape peripheral unit during the time while not request is being made by said peripheral unit;
         (d3b) means to generate an interrupt service request to said host computer to identify which one of the said printer or tape peripheral units has been selected to utilize said shared logic interface unit;
      (d4) said DLI controller state machine connected to said microprocessor system, said DLI latch unit and said host computer, and including:
         (d4a) means to execute data transfers between said DLI latch unit and said host computer upon instructions from said microprocessor system.
   (e) said microprocessor system for executing data transfers between said shared common logic interface unit, and said printer peripheral unit or one of said tape peripheral units.

2. The controller of claim 1 which includes:
   (a) a first printer peripheral interface unit for interfacing a printer peripheral to said microprocessor system;
   (b) a second tape peripheral interface unit for interfacing a plurality of tape peripherals to said microprocessor system;
   (c) and wherein said microprocessor system executes data transfers between said shared common logic interface unit and said first printer peripheral interface unit or said second tape peripheral interface unit.

3. The controller of claim 1 which includes:
   (a) a first status latch register means to carry a first status code signal from said microprocessor system indicating the status of said first virtual DLP, said first latch register having an address accessible by said host computer for readout of said first status code signal to said host computer;
   (b) a second status latch register means to carry a second status code signal from said microprocessor system indicating the status of said second virtual DLP, said second latch register having an address accessible by said host computer for readout of said second status code signal to said host computer;
   (c) means in said first and second status latch register means to signal said microprocessor system that a status code signal has been entered in said latch register or has not been entered;
   (d) and wherein said REQ-PAL includes means for enabling said host computer to address said first or second virtual data link processor and to receive said first or second status code signal in return, said returned status code signal functioning to inform said host computer whether said addressed virtual data link processor is prepared to accept a command instruction from said host computer.

4. The controller of claim 1 wherein said DLI controller state machine further includes:
   (a) means to sense when said host computer is currently addressing a particular one of said status latch registers;
   (b) means to generate an inhibiting signal to said microprocessor system to prevent said microprocessor system from entering a new status code signal into said particular one of said status latch registers being addressed by said host computer.

5. The controller of claim 1, wherein said microprocessor system includes:
   (a) means to control said DLI controller state machine and said REQ-PAL;
   (b) a RAM buffer memory connected to said first and second peripheral interface units and to said shared common interface units for temporarily holding data being transferred between said host and said peripheral interface unit.

6. A dual function I/O controller system, having first and second virtual controllers functioning within it, for managing data transfers between a host computer and at least two different peripheral units, said I/O controller comprising:
   (a) a shared data link front end interface means shared by said virtual controllers and providing a data path between said host computer and a master microprocessor means, and for controlling data transfers between said host computer and said master microprocessor means, said data link front end interface means including:
      (a1) a DLI slave controller for controlling data transfer between said host computer and said data link front end interface means, said DLI slave controller operating under command of said master microprocessor means;
   (b) said master microprocessor means for controlling data transfers between said data link front end interface means and a first and second peripheral interface means, said master microprocessor means including:
      (b1) A DMA (direct memory access) controller for controlling or initiating data transfer operations in response to a data transfer request from said first peripheral interface means and/or said second peripheral interface means;
   (c) said first peripheral interface means connected to a first type of peripheral unit;
   (d) said second peripheral interface means connected to a second type of peripheral unit;
   (e) and wherein said first and said second peripheral interface means includes:
      (e1) means to generate a request signal to said master microprocessor means and said DMA controller for initiation of a data transfer operation;
   (f) a means connected to receive control signals from said host computer, said first and second virtual controllers, and said master microprocessor means for determining whether said first and second virtual controller will utilize said shared data link front end interface means; said means for determining, including:
      (f1) a first and second status latch register means for holding coded signals, from said master microprocessor means, to indicate the operating condition status of said first and second virtual controllers, each of said status latch register means having addresses accessible to said host computer; and wherein each of said first and second status latch register means includes:
         (f1a) means to signal said master microprocessor means when it has accepted a new status value signal from said master microprocessor means;
         (f1b) means to inhibit said master microprocessor means from changing the value of the status signal in a particular one of said status latch register means presently being addressed during the time that the said particular one of said first or second status latch register means is being addressed by said host computer;
      (f2) a DLI logic latch unit for receiving address data from said DLI slave controller to identify a virtual controller requesting service of said host computer;
      (f3) a REQ-PAL (Request-Programmable Array Logic Unit) for receiving address data from said host computer which identifies said first or second peripheral interface unit; and for receiving data from said DLI slave controller to indicate which of said first or second virtual controllers is requesting service; and including:
         (f3a) means to control said DLI logic latch unit to select said first or second virtual controller for utilization of said DLI logic latch unit;
   (g) said first virtual controller operating to control data transfers to/from said first peripheral interface means;
   (h) said second virtual controller operating to control data transfers to/from said second peripheral interface means.

* * * * *